Oct. 23, 1928.
D. J. LASSLE
1,688,465
CREAM CAN COVER HOLDER
Filed Jan. 13, 1928
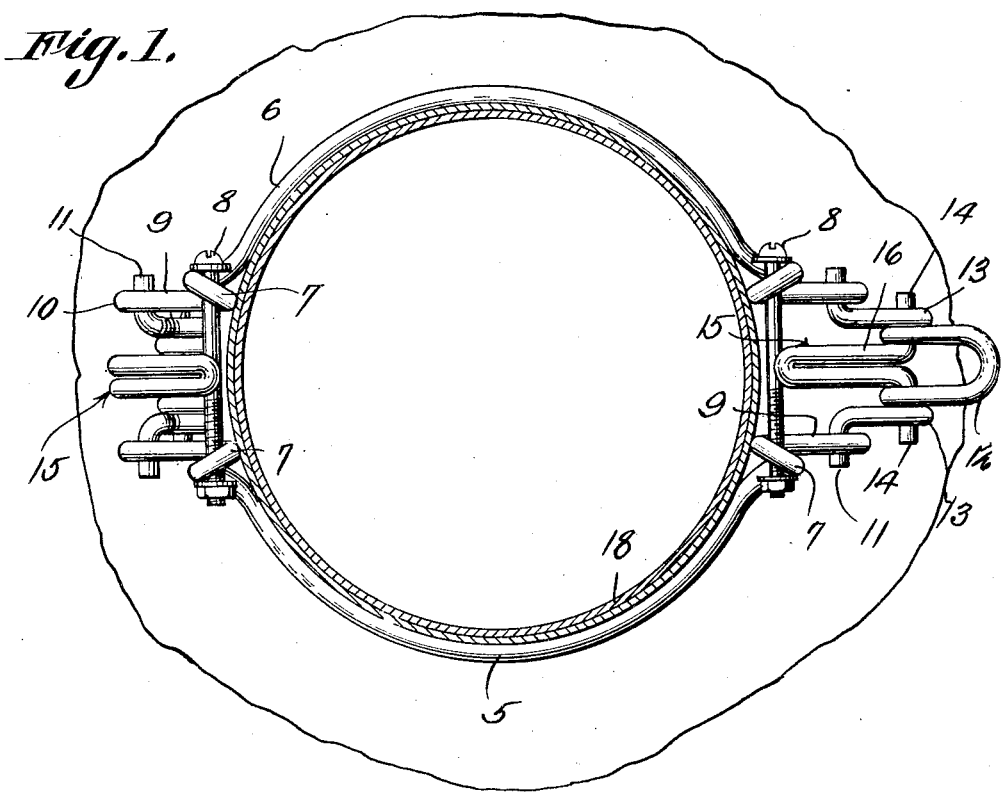
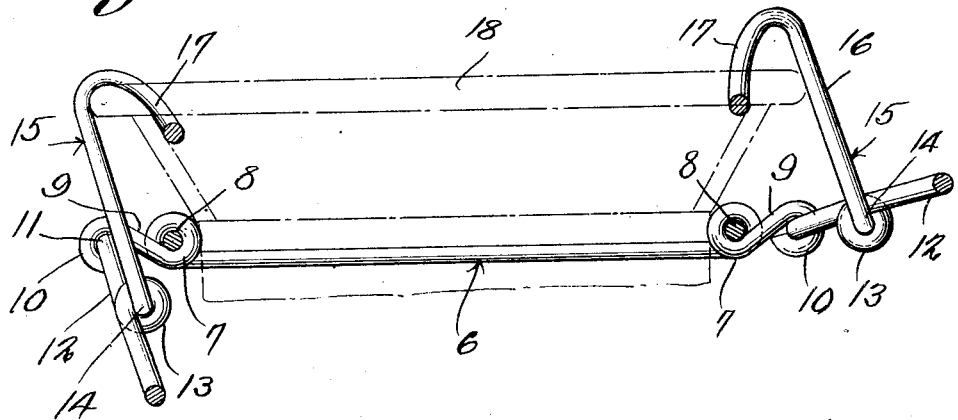
David J. Lassle
Inventor Patented Oct. 23, 1928.

1,688,465

UNITED STATES PATENT OFFICE.

DAVID J. LASSLE, OF WISHEK, NORTH DAKOTA.

CREAM-CAN-COVER HOLDER.

Application filed January 13, 1928. Serial No. 246,518.

This invention has reference to milk cans and aims to provide novel means for securing milk can covers within the can to insure against accidental displacement which usually results in the loss of the contents of the can.

An important object of the invention is to provide a device of this character which may be readily and easily positioned around the neck of a milk can, the device being separable so that the sections may be removed or bolted together around the neck of the can.

A still further object of the invention is to provide a securing device of this character including pivoted hook members adapted to hook over the upper edge of the milk can closure and be clamped in such position by especially constructed levers.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a transverse sectional view through the neck of a milk can showing a fastener constructed in accordance with the present invention in elevation.

Figure 2 is a side elevational view of the fastening device.

Referring to the drawing in detail, the device embodies a pair of separable sections 5 and 6 respectively, each section including a length of wire curved to conform to the curvature of the neck of the can, the ends of the wire being formed into loops as at 7 to receive the securing bolts 8 that are employed for securing the sections together.

The extremities of the sections extend laterally at 9 where they are formed into loops 10 to accommodate the right angled ends 11 of the levers 12, the levers being formed of lengths of wire material bent intermediate their ends defining loops 13 which accommodate the right angled extremities 14 of the hooks 15.

As shown, these hooks are formed of lengths of wire material bent intermediate their ends to define parallel legs 16 and right angled extremities 14, the hooks having portions 17 thereof bent to fit over the upper edge of the milk can closure, which in the present showing is indicated by the numeral 18.

From the foregoing it will be obvious that when the securing device has been positioned on the neck of a milk can and the portions 17 positioned over the upper edge of the can, the levers 12 may be pulled downwardly until the right angled extremities 14 of the hooks fall down below the loops 10, causing the hooks to closely engage the closure and lock the closure against accidental displacement.

It will be further noted that due to applicant's construction, the bolts 8 may be readily removed and the fastening device removed from the can neck without the necessity of bending the securing device around the can neck.

I claim:

1. A securing device for milk can tops including lateral sections, said lateral sections having loops formed adjacent to their ends, and having loops formed at their ends, bolts extending through the first mentioned loops to secure the sections around a milk can neck, a lever pivotally supported within the last mentioned loops, and hook members fitted over the upper end of a milk can top positioned in the neck, and said hook members adapted to be forced into engagement with the milk can top by the levers.

2. A securing device for milk can tops including separable sections, said sections embodying lengths of wire material curved to conform to the shape of the neck of a milk can and having lateral extensions formed with loops, adjacent to the ends of the lateral extensions and having loops at the ends of the lateral extensions, levers having loops and right angled ends, the right angled ends being fitted in the loops at the ends of the sections, hooks having right angled ends fitted in the loops of the levers, and said hooks adapted to fit over a can closure fitted in the milk can neck to secure the closure in position.

3. A securing device for milk can tops including a pair of lateral sections curved to fit around a milk can neck, the sections having loops formed intermediate their ends, bolts extended through the loops to secure the sections to the neck of a milk can, hooks pivotally connected with the sections and adapted to fit over the upper edge of a closure positioned in the milk can, and levers for drawing the hooks into close engagement with the closure.

4. A securing device for milk can tops including lateral sections curved to conform to the curvature of a milk can neck, said lateral extensions having loops, bolts extending through the loops for securing the sections to the milk can neck, said sections having lateral extensions formed with loops, levers extending into the loops, hooks pivotally connected with the levers, said hooks adapted to engage a milk can top positioned in the neck, and said levers adapted to secure the hooks against movement.

In testimony that I claim the foregoing as my own, I have hereto affixed my signature.

DAVID J. LASSLE.